United States Patent [19]
Richards

[11] Patent Number: 5,354,020
[45] Date of Patent: Oct. 11, 1994

[54] CABLE RESTRAINT SYSTEM

[76] Inventor: William J. Richards, 330 Webster St., Rockland, Mass. 02370

[21] Appl. No.: 69,124

[22] Filed: May 28, 1993

[51] Int. Cl.⁵ .............................................. F16L 3/22
[52] U.S. Cl. ..................................... 248/68.1; 248/73
[58] Field of Search ..................... 160/74.5, 74.1, 74.3, 160/68.1, 73, 65

[56] References Cited

U.S. PATENT DOCUMENTS

| | | | |
|---|---|---|---|
| 1,775,391 | 9/1930 | Fassinger | 248/68.1 X |
| 3,910,537 | 10/1975 | Laboue et al. | 248/68.1 |
| 3,920,887 | 11/1975 | Kloos et al. | 248/68.1 X |
| 3,968,323 | 7/1976 | Blanchet | 248/68.1 X |
| 4,267,994 | 5/1981 | Lynch et al. | 248/65 |
| 4,347,998 | 9/1982 | Loree | 248/68.1 |
| 4,781,255 | 11/1988 | Lock et al. | 248/68.1 X |

FOREIGN PATENT DOCUMENTS

| | | | |
|---|---|---|---|
| 479024 | 7/1929 | Fed. Rep. of Germany | 248/68.1 |
| 45142 | 1/1966 | Fed. Rep. of Germany | 248/68.1 |
| 9005870 | 5/1990 | PCT Int'l Appl. | |

Primary Examiner—Blair M. Johnson
Attorney, Agent, or Firm—Bromberg & Sunstein

[57] ABSTRACT

An apparatus and a method for mounting a plurality of cables adjacent a wall more easily and more securely. The apparatus includes an arm adapted at one end for engaging a receptacle in a stanchion, which is securely attached to the wall. Mounted on the arm is a restraint, which has a plurality of uprights, and which holds and separates the cables. The restraint is adapted at one end for engaging the stanchion's receptacle so that, along with the engaging end of the arm, it locks the restraint and the arm in the receptacle. Each of the restraint's uprights has at least one slot, through which a capture bar is inserted so as to hold each cable between a pair of uprights. The capture bar preferably includes a locking mechanism for holding it in place in the slots.

11 Claims, 6 Drawing Sheets

CABLE RESTRAINT SYSTEM

DESCRIPTION

1. Technical Field

This invention relates generally to systems for holding cables, and particularly systems for holding electrical cables having diameters of one to a few inches.

2. Background Art

Figure 1:
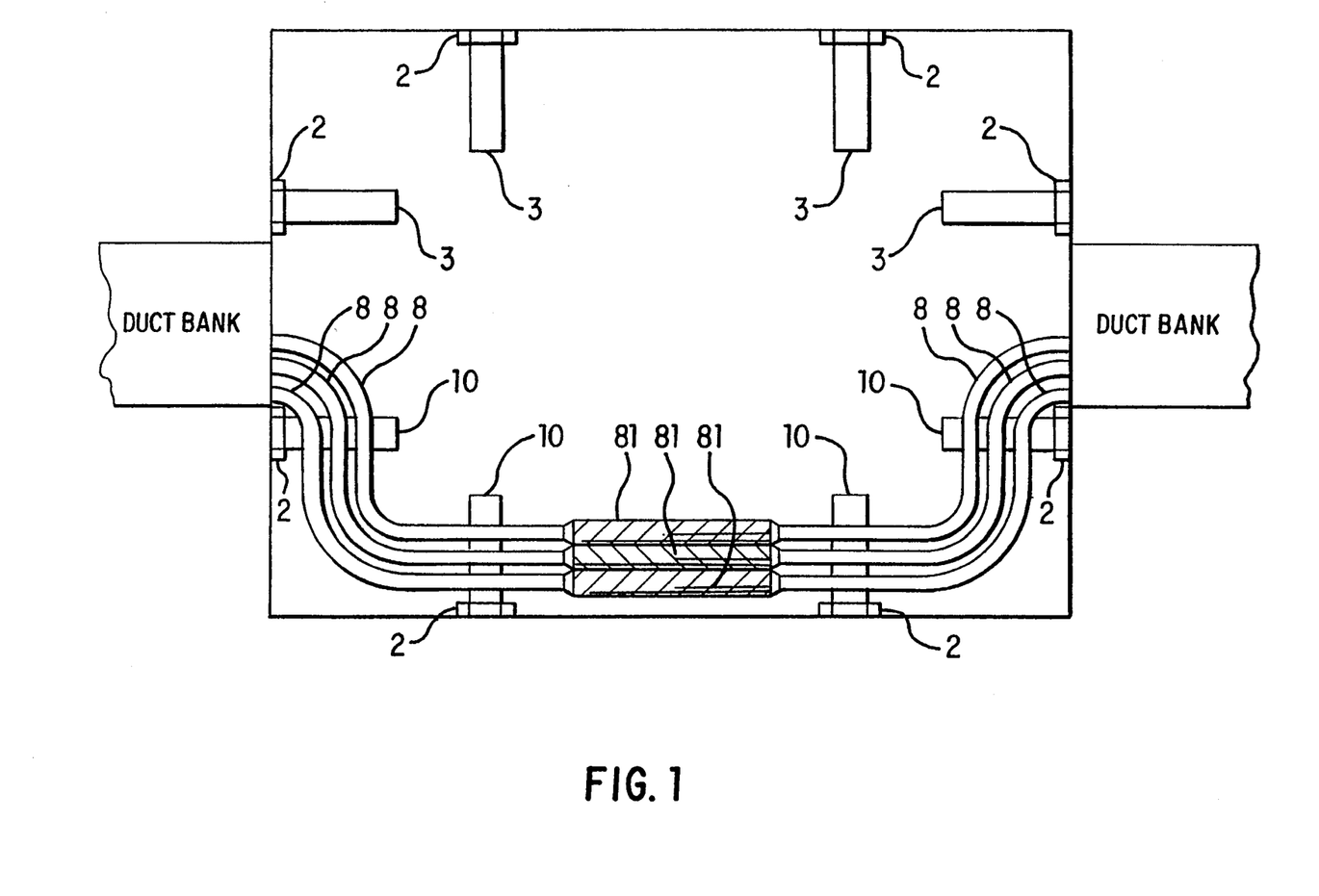
FIG. 1 shows where the cable restraints may be used in a manhole.

FIG. 1 shows a top view of a typical manhole having electrical cable running through it. Restraints or hanger systems 10 are necessary to guide the cables 8 around bends and corners. Simple supports, which merely support the weight of the cables 8 but do not restrain the cables, may be used to support the cables where there are no bends or corners. Cables splices 81 are usually located in a manhole. Prior-art cable support systems use a vertically mounted wall stanchion having several receptacles, into which arms may be inserted. Saddle-type porcelain insulators, which are a type of simple support, are slipped over T-shaped arms. (V-shaped arms are also used in the prior art.) Cables merely rest on the saddle-type insulators, which keep the cables separated, but which do not fully restrain the cables. Separating the cables minimizes damage due to service failures.

A prior-art restraint system, using split porcelain spools, does keep the cables fully restrained and separated. A bottom metal portion of the split porcelain spool is normally bolted onto a T-shaped arm, which is inserted into the stanchion. The cable is then placed between two porcelain portions, which together surround the cable. The two porcelain halves and the cable are then placed on the bottom metal portion. Then, the top metal portion of the spool is bolted to the bottom metal portion, so as to hold the two porcelain halves together and to the arm, thereby restraining the cable. Differently sized split porcelain spools are used for accommodating cables of different diameters.

Using split porcelain spools to restrain cables is somewhat time-consuming and usually requires the use of two workers—one worker to hold the cable and the two porcelain halves in place and the other to bolt the metal portions together. The need for two workers has become all the more necessary with the growing use of plastic- and synthetic-rubber-insulated non-lead-sheath cable—known as poly-cable—which was first brought into widespread use about twenty years ago. Poly-cable tends to curl up, unlike the lead-sheath cable, which has been in use longer. This tendency to curl makes it more difficult to mount the cables, and it frequently causes the arm to be pulled out of the wall stanchion. Thus, although the split-porcelain pool restraint would hold the cable to the arm, the arm would not be adequately held in the stanchion. A further disadvantage of using split porcelain spools is the necessity of having a different spool sizes for each cable size.

SUMMARY OF THE INVENTION

The invention provides an apparatus and method for mounting a plurality of cables adjacent a wall. The invention makes the mounting of the cable easier and more secure. The apparatus includes an arm adapted at one end for engaging a receptacle in a wall stanchion, which is securely attached to the wall. Mounted on the arm is a separator means—or restraint—having a plurality of uprights. The restraint holds and separates the cables. Each of the uprights has at least one slot, through which a capture bar is inserted so as to hold each cable between a pair of uprights. The capture bar preferably includes a locking mechanism for holding it in place in the slots.

In a preferred embodiment of the invention, the restraint includes a base, which rests on the arm and which is adapted at one end for engaging the wall stanchion's receptacle. The engaging ends of the restraint and the arm work together to lock the arm and the restraint into the receptacle. The uprights are preferably fixedly attached, preferably by welding or riveting, to the base.

In an alternative embodiment, the restraint includes a strip of metal bent to form the uprights. The bent metal strip may be fixedly attached, preferably by welding, to a base, which rests on the arm. One end of bent-metal portion has means for engaging the wall stanchion's receptacle along with the engaging means of the arm.

In either of these embodiments, the arm is preferably provided with a pair of lips or flares running along the tops of its sides, and the restraint provided with C-shaped flanges along the sides of its bottom, so that the flares may be inserted through the flanges.

Preferably, each of the uprights has a plurality of slots to accommodate a plurality of cable sizes, wherein each upright has a slot for each of the plurality of cable sizes. For each cable size, the distances of the slots from the bottom of the uprights are substantially the same.

Preferably each of the foregoing components is made of a heavy-duty metal, such as stainless steel.

The preferred method of mounting a plurality of cables adjacent a wall includes the steps of securely attaching the wall stanchion to the wall (or using a previously attached stanchion), and then inserting in the receptacle the engaging ends of both the arm and the restraint, such that the restraint rests on the arm. Each of the cables is then placed between a pair of the restraint's uprights, and the capture bar inserted through the slots over the cables so as to hold each cable in place. In a preferred embodiment, each cable is wrapped in a leader guard having a slot, so that the leader guard surrounds that portion of the cable located between two uprights, and the capture bar is inserted through the slots in the leader guards as well as the slots in the uprights.

BRIEF DESCRIPTION OF THE DRAWINGS

These and other features, aspects and advantages of the present invention will become better understood with regard to the following description, appended claims and accompanying drawings where:

FIGS. 3A–3D show several views of a component used to form the uprights of the restraint shown in FIG. 2, FIG. 3A is a top view.

FIGS. 4A and 4B show two views of the base component of the FIG. 2 embodiment, FIG. 4A is a top view.

DESCRIPTION OF SPECIFIC EMBODIMENTS

Figure 2:
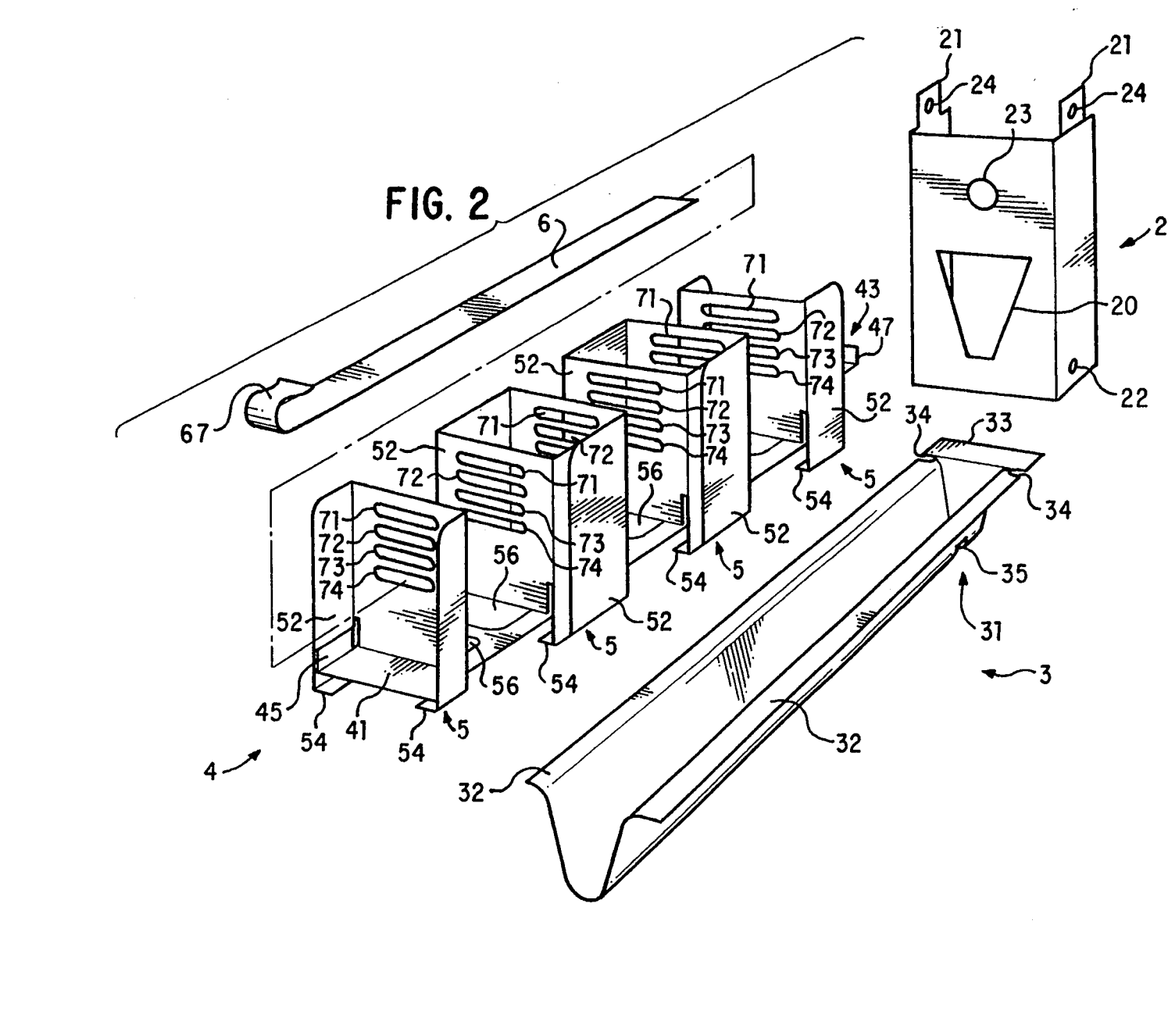
FIG. 2 shows the components of a restraint system according to a preferred embodiment of the present invention.
Figure 3A:
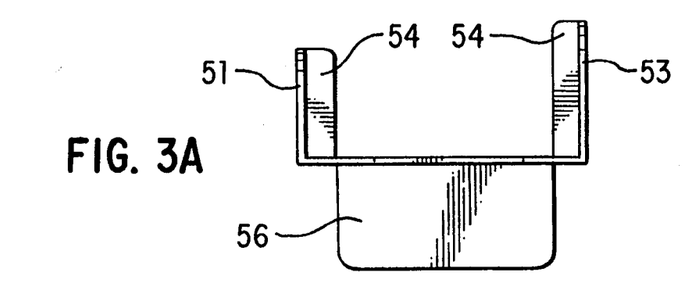
Figure 3B:
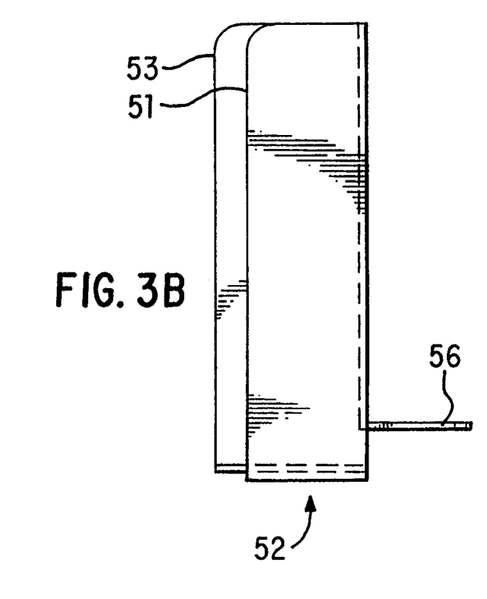
FIGS. 3B and 3D are side views.
Figure 3C:
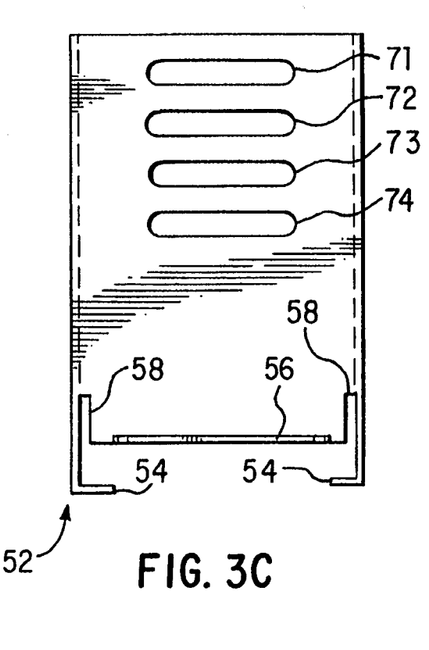
FIG. 3C is a view showing the face of the upright component adjacent a cable when the cable is mounted on an assembled restraint.
Figure 3D:
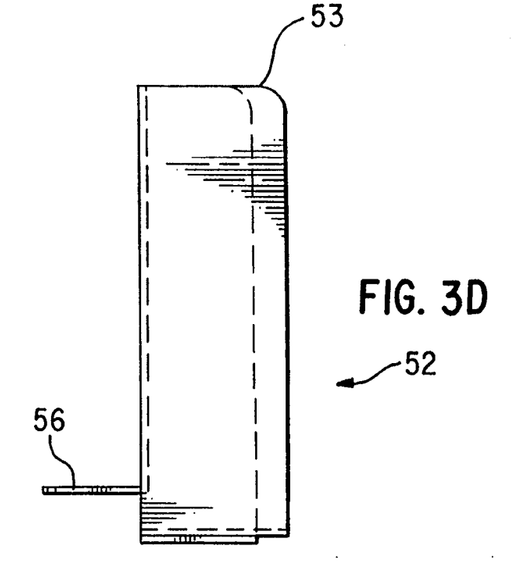

FIG. 2 shows a restraint or hanger system according to the present invention. One of the components of this preferred embodiment of the invention is a modular wall stanchion 2. The wall stanchion 2 includes a hole 23 through which a screw or nut is inserted to secure the stanchion 2 to the wall. In a preferred embodiment, the top of the modular stanchion 2 has a pair of attachment meters 21, in which are screw holes 24, and at the bottom of the sides of the stanchion 2 are additional screw holes 22. Several of the modular stanchions 2 may be attached to each other by lining up and screwing together the bottom screw holes 22 and the top screw holes 24 of two stanchion modules 2. The wall stanchion 2 has a receptacle 20, which is shaped like the receptacles of previous wall stanchions. The hanger system shown in FIG. 2 may be used with the prior-art wall stanchions, which typically had several receptacles, instead of the modular stanchion 2 shown in FIG. 2.

A generally V-shaped arm 3 has at one end 31 a notch 35 on its bottom and notches 34 in the flares (lips) 32 running along the tops of both sides of the arm 3. The arm 3 is reinforced with a bar 33 and is very similar to prior-art V-shaped arms. The arm's notches 34 and 35 are arranged so that the arm 3 may be held by the stanchion's receptacle 20, with the weight of the arm keeping it in place.

A restraint 4 is provided with C-shaped flanges 54, so that the restraint 4 may be slipped over the flares 32 of the arm 3. The engaging end 43 of the restraint 4 is adapted so that it can engage the top of the stanchion's receptacle 20. The restraint 4 is slid onto the arm 3 after the arm 3 is placed in the receptacle 20. The engagement end 43 of the restraint is bent down momentarily manually (or by means of a screwdriver or crowbar, for example), so that the lip 47 (which is shown more clearly in FIG. 4B) of the restraint's engagement end 43 can pass under the top of the stanchion's receptacle 20. Once the lip 47 of the restraint's engagement end 43 is inserted into the receptacle 20 the lip 47 is allowed to return to its original position. The resiliency of the restraint's engagement end 43 forces the arm's engagement end 31 downward into the bottom of the receptacle 20. The lip 47 on the restraint's engagement end 43 and the notches 34 and 35 on the arm 3 causes the restraint 4 and arm 3 to be securely engaged in the stanchion's receptacle 20. This system is much less likely to be pulled out of the receptacle 20 by cables having a tendency to curl (e.g., poly-cable) than previous cable restraint systems.

Figure 5:
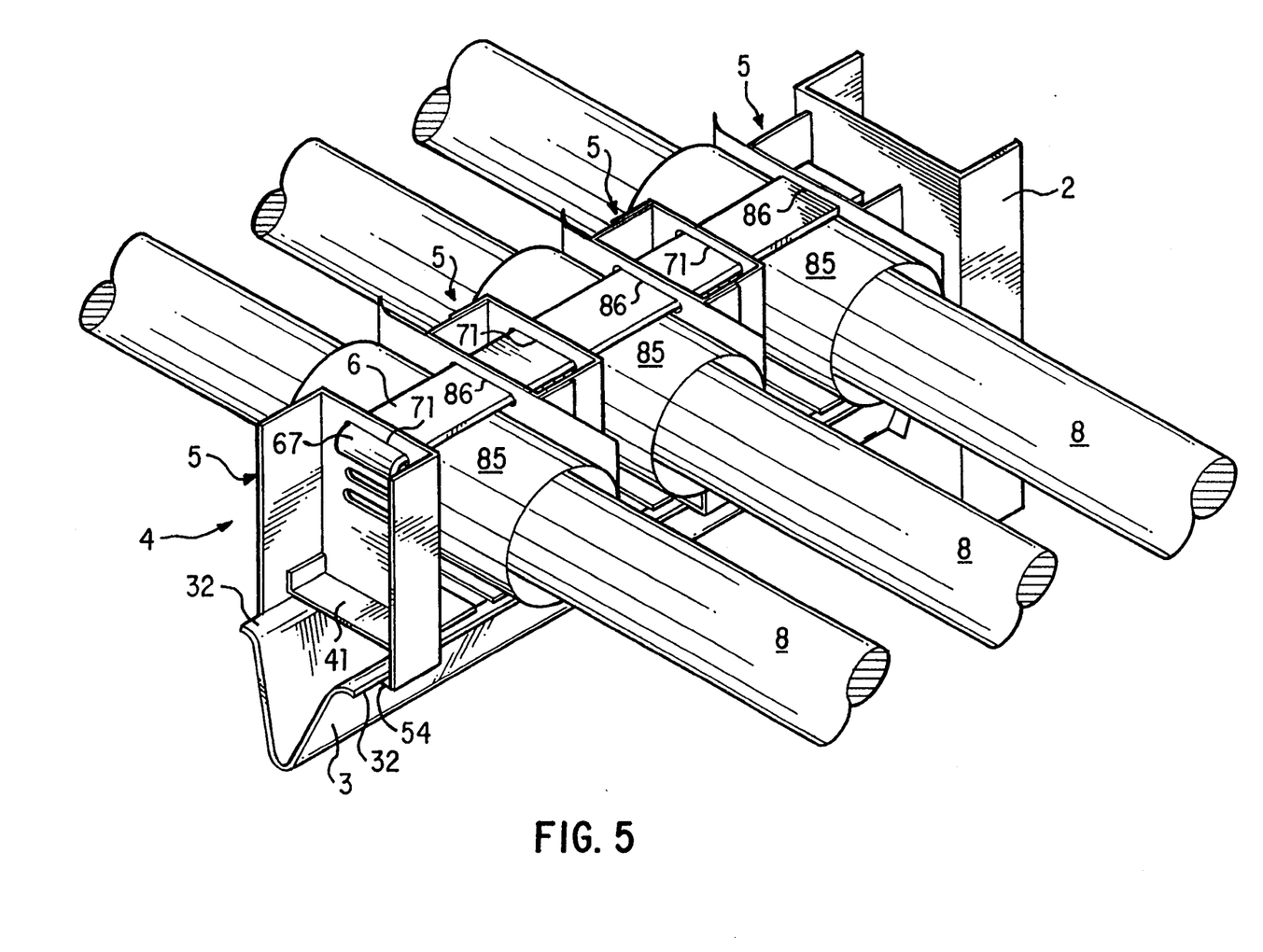
FIG. 5 shows three cables mounted in the restraint shown in FIG. 2.

Once the restraint 4 is placed on the arm 3 and its engaging end 43 is engaged with the stanchion's receptacle 20, cables may be inserted between the uprights 5 of the restraint 4. The embodiment shown in FIG. 2 has four uprights 5, and therefore is meant to hold as many as three cables. Once a cable is placed between the uprights 5, a capture bar 6 is inserted through one of the four sets of slots 71–74 in the uprights 5 so as to cover the cable. The slots of each set, for example 71, are all placed about the same distance from the bottom of the uprights 5. The set of slots used depends, of course, on the diameter of the largest cable being held by the restraint. In order to give the cables as little leeway as possible, the lowest set of slots that may be used should be used. Of course, the set of slots used must be higher than the diameter of the largest cable in order for the capture bar 6 to be able to pass through all the slots of the set. By providing the restraint 4 with several sets of slots 71–74, it is not necessary to have a different restraint for each cable size. The capture bar 6 has a curved end 67, which is used to lock the capture bar 6 in place. In the upright 5 furthest from the stanchion 2, the curved end 67 passes around the upright material defining the top or bottom of the slot that the capture bar 6 passes through, and through an adjoining slot (see FIG. 5) or over the top of the upright 5. After it has been locked in position, the capture bar 6 may be released by using a screwdriver or a crowbar. If the cables being mounted are very prone to curling up, it may be preferred to mount the cable furthest away from the wall 2 first, and then insert the capture bar 6 only far enough so that it passes through only the two uprights 5 furthest from the stanchion 2 (with the end of the capture bar 6 going only part of the way through the upright 5 second furthest from the stanchion 2). Then, the next cable may be placed between the second and third uprights 5, and the capture bar 6 advanced to the next upright. Finally, the last cable is placed between the two uprights 5 closest to the stanchion 2, and the capture bar 6 advanced until it is locked into place, as shown in FIG. 5.

Figure 4A:
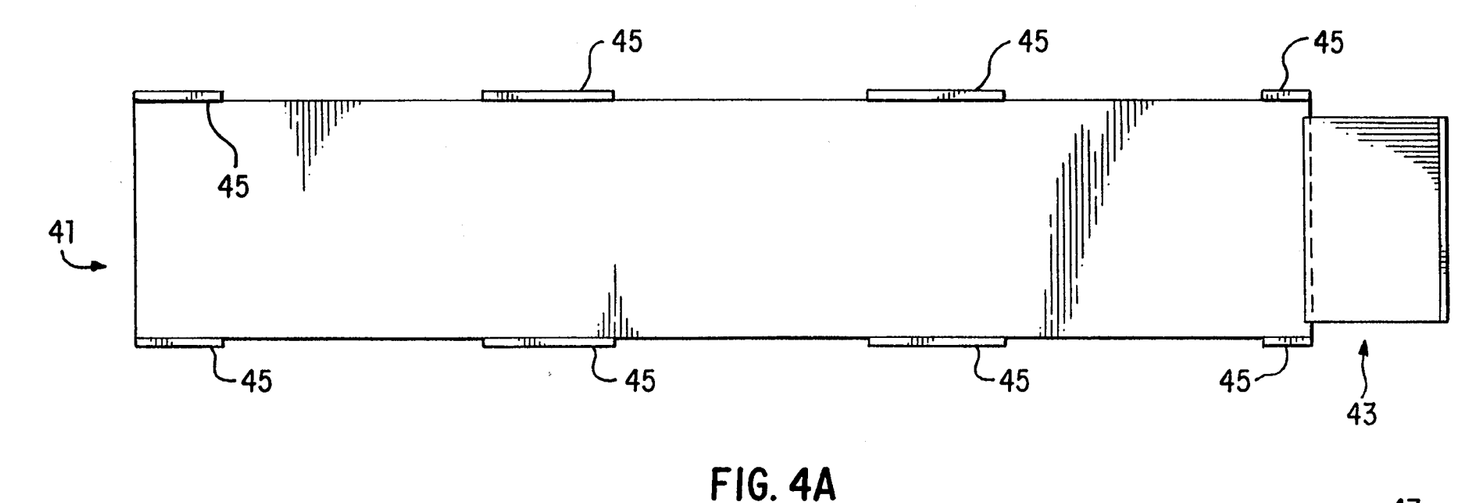
Figure 4B:
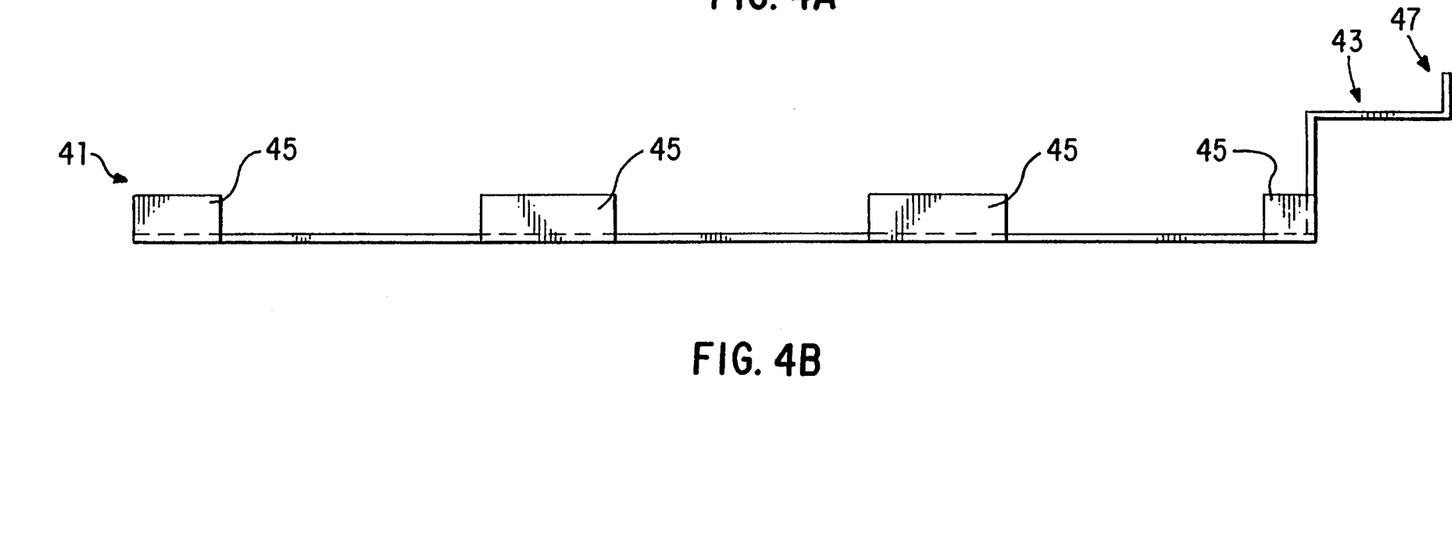
FIG. 4B is a side view.

The restraint 4 shown in FIG. 2 is made using simplified construction, which uses only two types of components: upright components 52, one of which is shown in FIGS. 3A–3D, and a base component 41, which is depicted in FIGS. 4A and 4B. The two uprights 5 at either end of the restraint 4 shown in FIG. 2 consist of only one upright component 52 each. The two middle uprights 5 consist of two upright components 52 each, placed back to back. For the restraint shown in FIG. 2, six upright components 52 are slipped onto a base component 41 and welded into place to form four uprights 5.

As can be seen in FIGS. 3A–3D, each upright component has four slots 71–74 for receiving a capture bar. Each upright component 52 has notches 58 in its bottom, into which the struts 45 of the restraint's base component 41 (see FIGS. 4A and 4B) are placed. The base's struts 45 are welded to the upright component's sides 51 and 53. Each of the upright components 52 also have extending out from its bottom a bracketing member 56, which may also be welded to the base 41 and which help keep the upright components upright. Instead of welding the components to each other, the various components 52 and 41 making up the restraint 4 may be riveted to each other. Each upright component 52 has extending down from its bottom a pair of flanges 54. These flanges 54 are used to hold the restraint 4 to the arm 3.

The sides 51 and 53 of each upright component 52 have different widths, and likewise the flanges 54 of each upright component extend down different lengths. This asymmetry permits a pair of upright components to be placed back to back to form the middle uprights of the restraint 4 shown in FIG. 2. This structure provides the restraint 4 with rigidity.

The restraint components, namely the base component 41 and the upright components 52, are preferably made of a durable, heavy-duty metal, such as 16 gauge stainless steel. These components are preferably made by punching out a portion of sheet metal (using a turret punch for example) and then bending the punched-out sheet metal (using a press brake for example). (An automatic feed coil line may also be used to make these components and is an efficient way of making large numbers of these components).

Figure 6:
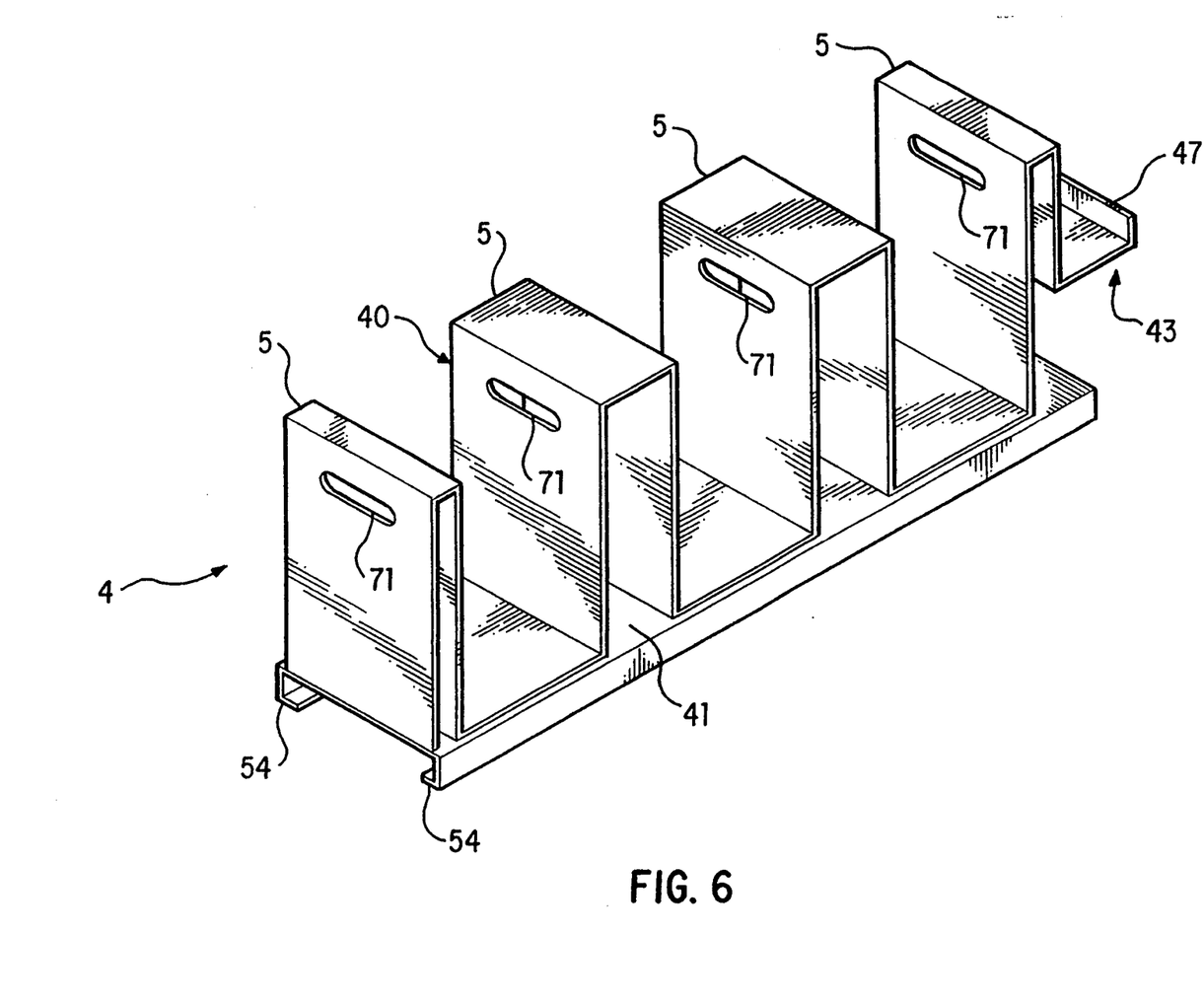
FIG. 6 shows a restraint according to an alternative embodiment of the invention.

Another method of making the restraint 4 is to bend a single strip 40 of steel to form all four uprights, as shown in FIG. 6. The bent steel strip 40 is welded to a slide-tray base 41 having flanges 54 extending the length of the restraint, into which the flares 32 along the sides of the arm 3 (shown in FIG. 2) may be slipped. One end of the bent strip 40 may be bent to form an engagement end 43 similar to that shown in FIG. 4B, including having a lip 47 for locking the restraint 4 and the arm 3 to the stanchion 2. The restraint's engagement end 43 is inserted into the receptacle of the stanchion 2 just like the restraint 4 shown in FIG. 2. The restraint 4 shown in FIG. 6 has less torsional rigidity than the embodiment shown in FIG. 2, and thus is more likely to twist when cables 8 are placed on it. Such twisting of the restraint 4 causes the misalignment of the restraint's slots 71, making it difficult to insert the capture bar 6. The construction of the restraint 2 shown in FIG. 2 makes it more rigid and therefore easier to use.

FIG. 5 shows the restraint system shown in FIG. 2 assembled, holding cables 8 and inserted in a somewhat different wall stanchion 2. FIG. 5 also shows the use of leader guards 85 to protect the cable 8 from abrasion by the restraint 4. Leader guards have typically been used to protect cables that come out from the end of a pipe or other duct from being chafed by the end of the duct. Slots 86 may be placed in the leader guards 85, so that the capture bar 6 may be passed through the slots 86 and thereby hold the leader guards 85 in place. The slotted leader guards 85 may, of course, also be used with the restraint shown in FIG. 6. The leader guards 85 may have some flaring at their ends to accommodate better any bending of the cables 8 adjacent the restraint, as shown for example in FIG. 1.

Although the invention has been described with reference to several preferred embodiments, it will be understood by one of ordinary skill in the art that various modifications can be made without departing from the spirit and the scope of the invention, as set forth in the claims hereinbelow.

What is claimed is:

1. A cable restraint system for mounting a plurality of cables adjacent a wall, the system comprising:
    a stanchion having a receptacle, the stanchion including means for securely attaching the stanchion to the wall;
    an arm having, at one end, means for engaging the receptacle;
    separator means for holding and separating the cables, the separator means including
        a base slipped onto the arm so that the base rests on the arm,
        at least three integrally formed uprights extending upwardly from the base, the uprights being fixedly attached to the base and being arranged so that each cable has an upright on both sides of it, the height of each upright being greater than the diameter of each cable, each of the uprights having a slot, the slots being substantially the same distance from the bottom of the uprights, and
    means, located at one end of the separator means, for engaging the receptacle of the stanchion, so that the separator means is locked into the receptacle; and
    a capture bar for insertion through the slots over the cables so as to hold each cable between a pair of uprights, the capture bar including locking means for holding it in place in the slots.

2. A system according to claim 1, wherein the arm has a pair of lips running along the tops of the arm's sides, and the base of the separator means has C-shaped flanges along the bottom of the base's sides, so that the arm's lips may be inserted through the flanges of the separator's base.

3. A system according to claim 1, further including leader guards for wrapping that portion of each of the cables located between the uprights, each of the leader guards having a slot, through which the capture bar is inserted.

4. A system according to claim 1, wherein the base and the uprights are metal and are welded to each other.

5. A system according to claim 1, wherein the base and the uprights are metal and are riveted to each other.

6. A system according to claim 1, wherein the separator means includes a strip of metal bent to form the uprights.

7. A system according to claim 1, wherein, each of the cables being mounted may have one of a plurality of sizes, and wherein each of the uprights have a plurality of slots such that each upright has a slot for each of the plurality of cable sizes.

8. A method of mounting a plurality of cables adjacent a wall, the method comprising:
    inserting in a receptacle of a stanchion securely attached to the wall an arm having, at one end, means for engaging the receptacle;
    mounting on the arm a separator for holding and separating the cables, the separator including first, second and third uprights, the first upright being located further from the wall than the second upright, which is located further from the wall than the third upright, each of the uprights having a slot, the distances of the slots from the bottom of the uprights being substantially the same and being at least as great as the diameter of each cable;
    placing a first cable between the first and second uprights;
    inserting a capture bar through the slots of the first and second uprights over the first cable so as to hold the first cable between the first and second uprights;
    placing a second cable between the second and third uprights, while the capture bar is inserted in the slots of the first and second uprights; and
    inserting the capture bar over the second cable through the slot of the third upright so as to hold the second cable between the second and third uprights, the capture bar including locking means for holding it in place in the slots after the capture bar has been inserted its full length into the uprights' slots.

9. A method according to claim 8, further including the steps of:
    wrapping each cable in a leader guard having a slot, so that the leader guard surrounds that portion of the cable located between two uprights; and
    inserting the capture bar through the slots in the leader guards as well as the slots in the uprights.

10. A method according to claim 8, wherein the separator includes means, located at one end of the separator, for engaging the receptacle of the stanchion, so as to lock the separator into the receptacle, and and wherein the step of mounting the separator on the arm includes sliding the separator onto the arm and causing the separator's engaging means to lock the separator into the receptacle.

11. A method of mounting a plurality of cables adjacent a wall, the method comprising:

inserting in a receptacle of a stanchion securely attached to the wall a structure having means for engaging the receptacle, at one end of the structure, and first, second and third uprights extending upwardly from the structure, the first upright being located further from the wall than the second upright, which is located further from the wall than the third upright, each of the uprights having a slot, the distances of the slots from the bottom of the uprights being substantially the same and being at least as great as the diameter of each cable;

placing a first cable between the first and second uprights;

inserting a capture bar through the slots of the first and second uprights over the first cable so as to hold the first cable between the first and second uprights;

placing a second cable between the second and third uprights, while the capture bar is inserted in the slots of the first and second uprights; and inserting the capture bar over the second cable through the slot of the third upright so as to hold the second cable between the second and third uprights, the capture bar including locking means for holding it in place in the slots after the capture bar has been inserted its full length into the uprights' slots.

* * * * *